United States Patent [19]

Walter

[11] 4,335,749
[45] Jun. 22, 1982

[54] ROTARY SLIDE STEERING VALVE FOR AUXILIARY POWER STEERINGS OF MOTOR VEHICLES

[75] Inventor: Wolfgang Walter, Schwabisch Gmund, Fed. Rep. of Germany

[73] Assignee: Zahnradfabrik Friedrichshafen, AG., Friedrichshafen, Fed. Rep. of Germany

[21] Appl. No.: 68,363

[22] Filed: Aug. 21, 1979

[30] Foreign Application Priority Data

Aug. 16, 1978 [DE] Fed. Rep. of Germany ....... 2835815

[51] Int. Cl.³ .................................................. F15B 9/10
[52] U.S. Cl. .......................... 137/625.22; 137/625.24; 91/372; 91/375 A
[58] Field of Search ................. 91/375 A, 375 R, 372; 137/625.21, 625.23, 625.22, 625.24

[56] References Cited

U.S. PATENT DOCUMENTS 3,867,870 2/1975 Shimoura ..................... 91/375 A X

*Primary Examiner*—Alan Cohan

*Attorney, Agent, or Firm*—Zalkind & Shuster

[57] ABSTRACT

A rotary steering control valve is provided of generally conventional construction having incorporated therein small diameter flow passages to effect throttling of return flow from a power cylinder. The throttling of exhaust from a power steering cylinder is known to be advantageous, e.g., for stifling noise, and the present invention has throttle passages incorporated directly in one of the relatively rotative valve members in such arrangement that when the valve is in neutral position for straight ahead steering, there is circulation of little pressure through the valve without throttling. However, during steering, the throttle passages are aligned in the exhaust circuit from either end of a double acting hydraulic motor so as to achieve exhaust flow throttling. The function is achieved by a novel arrangement of the coacting flow control edges and various grooves of the rotary valve plug and the encompassing sleeve which provide a multiplicity of return flow paths. Such grooves can be machined into the plug and sleeve, several at a time, by broaches and milling cutters in an economical manner.

14 Claims, 5 Drawing Figures

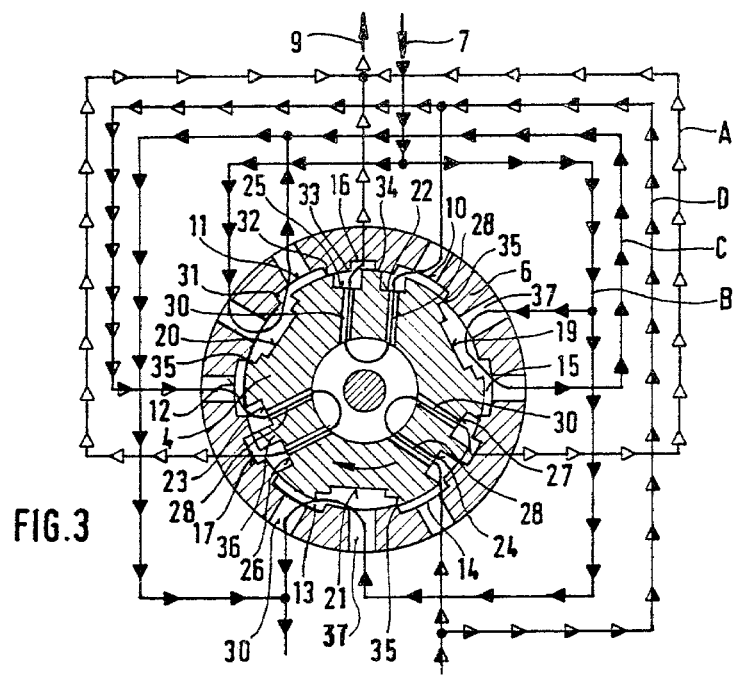
FIG.3
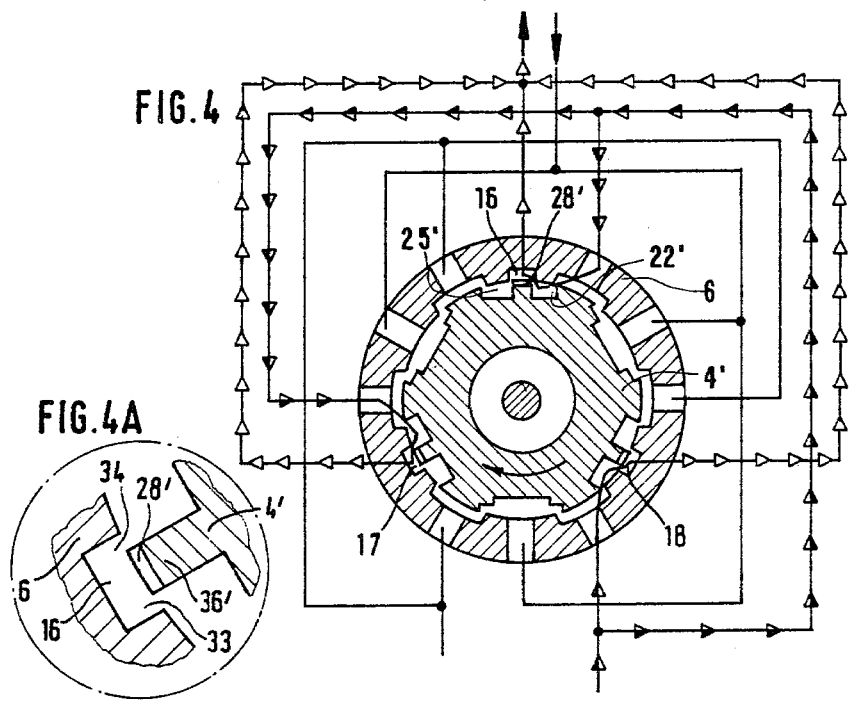
FIG.4
FIG.4A

ROTARY SLIDE STEERING VALVE FOR AUXILIARY POWER STEERINGS OF MOTOR VEHICLES

The throttling of exhaust flow is not new, and in particular, where throttling is used with rotary valves above a certain pressure level, there are annoying hissing noises which occur in the coating flow control edges between the valve plug and the encompassing valve sleeve. Such noises increase with the rise in pressure ratios of the pressure upstream and downstream of coacting flow control edges. The greater the pressure gradient, the more objectionable is the noise.

General constructions and modes of manufacture for rotary valves of the kind used in power steering systems are shown in U.S. patents such as Bishop U.S. Pat. No. 3,591,139 and Eddy et al. U.S. Pat. No. 3,296,940.

Prior art solutions to the problem have been known which change pressure conditions at the coacting edges by the throttling of flow return. Such flow restriction does effect a reduction in the flow noises, but there is the drawback in that the restriction causes problems when the rotary valve is in neutral position for straight ahead steering. One such drawback is the deterioration of return movement of the steering mechanism. Additionally, an unnecessary heating up of hydraulic fluid and waste of power results.

The present invention solves the problems of minimizing noises in rotary steering control valves during steering actuation by effecting a desired and predetermined throttling pressure. Yet, when the valve is in neutral position the steering function of the vehicle is not disadvantageously influenced.

In point of general information, it is known that there are certain disadvantages in prior art steering systems which occur in the return flow from the exhausting chamber of a servomotor or during return movement of vehicle wheels where a servomotor is used in a booster steering system. There is an occurrence of pressure building up in the return flow line which is harmful to housing gaskets and ultimately causes breakdown or leakage. The result of that is increased friction in movement of components and steering effort becomes sluggish. There is, furthermore, a waste of energy inherent in the neutral position of rotary valve members during straight ahead steering where return flow from supply to sump is throttled needlessly. Such energy waste occurs by way of heating up of the oil in transit due to being under pressure.

As will be apparent, the present invention completely eliminates such disadvantages by providing throttling via restricted through passages only for return flow from an exhausting servomotor chamber.

Briefly, the construction utilizes a relationship of coacting flow control edges between a valve plug and valve sleeve which, in the case of neutral position, there is no flow through a throttling passage in the bypassing of feed pressure from pump to exhaust. On the other hand, during steering actuation, all exhaust flow is routed through a plurality of throttling means each of which comprises at least one throttle passage. However, the preferred arrangement shown herein is such that each such means has two serial throttle passages for exhaust flow which effects greater noise elimination by gradual pressure reduction. In straight ahead steering, the valve in neutral position, the flow from pump to exhaust is essentially pressureless, except, of course, for the usual frictional flow losses necessitated by the hydraulic fluid passing through the valve.

In particular, the construction utilizes flow control edges in the valve member which cut off flow bypass when the valve is actuated for steering and in addition to opening flow for feed pressure to one chamber of a double acting steering booster cylinder, also open up the throttling passages so that exhaust flow must take place therethrough from the other chamber.

The valve plug and valve sleeve can be made relatively simply and economically and in the form disclosed herein the return circuit utilizes a multiplicity of broached return grooves extending longitudinally the entire length of the valve sleeve, all of which are in communication with a common return passage.

Other grooves of arcuate contour which are closed and extend longitudinally in the valve sleeve and valve plug and can be gang milled. The valve plug is provided with at least one throttling bore to conduct return flow but preferably two bores are provided to serially conduct such flow via the hollow interior of the valve plug. Further, the construction utilizes closed end grooves in the valve plug for return flow which are manufactured in a simple manner as pairs of grooves by having respective bridges or partitions between the grooves to effect double groove formations or slots.

Accordingly, the manufacture of both the valve sleeve and the valve plug is readily accomplished for the most part by broaching a multiplicity of grooves or slots that may be made simultaneously with properly formed broaches, and by gang milling, all as will be apparent from the disclosure to persons skilled in the art.

The mode of manufacture permits sets of throttle bores and respective pairs of return flow grooves to be readily made in a valve plug, wherein the grooves may be put in communication alternately with common flow return grooves in a valve sleeve. Further, all such throttle bores and respective pairs of return flow grooves with flow control edges may readily be made in sets in symmetrical circular array to provide a plurality of simultaneous flow paths.

A detailed description of the invention now follows in conjunction with the appended drawing in which:

FIG. 3 illustrates the flow directions showing the symmetry of flow by means of arrows in a relatively rotated steering position of the valve members;

FIG. 4 is a radial section showing a modification of the invention wherein the restricted flow passages are effected by means of small grooves, rabbets, or shallow indentations at the tips of partitions intermediate alternately positionable grooves for flow return from either chamber of a servomotor;

FIG. 4a shows in a phantom line circle an enlarged detail of the tip of one of the partitions and a throttling indentation thereat.

Figure 1:
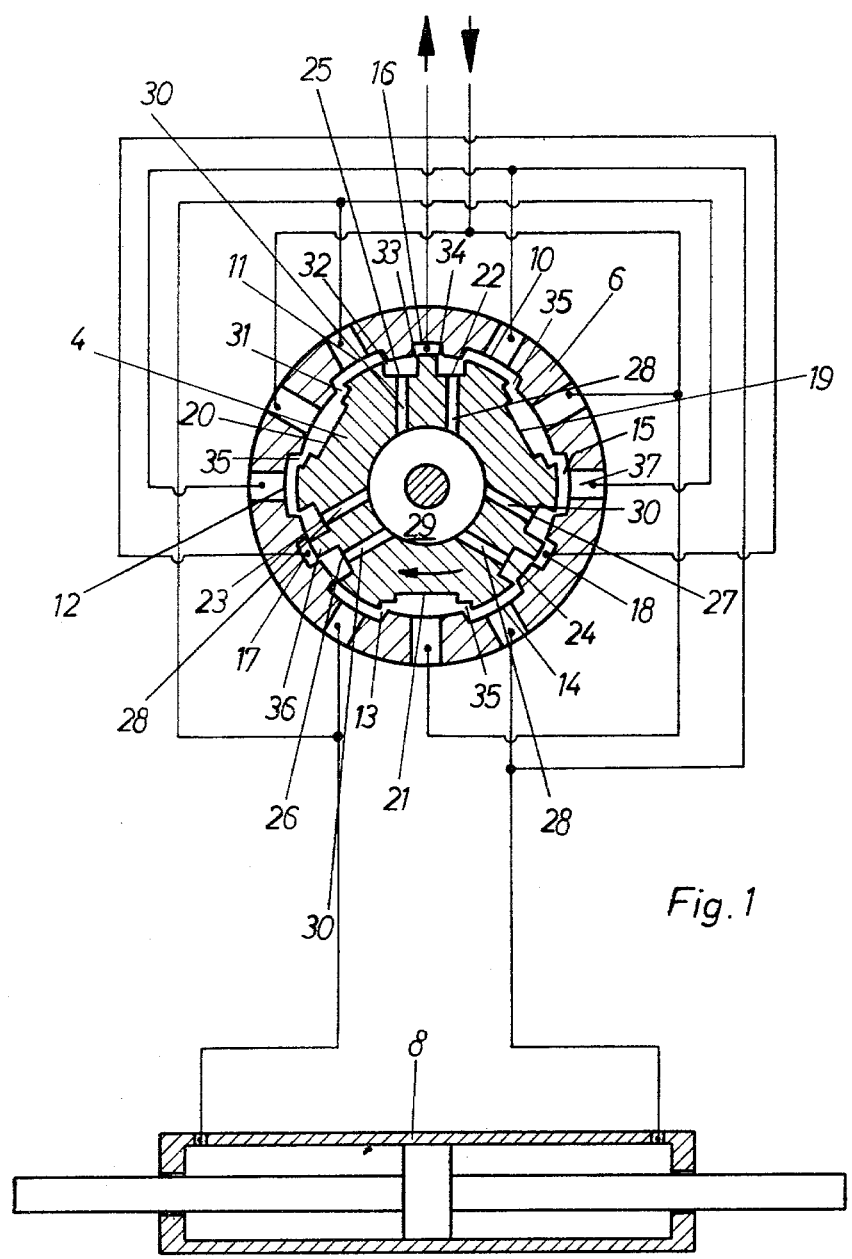
FIG. 1 is a radial cross section on the line II—II of FIG. 2, through a valve of the invention, in neutral position, showing the valve plug and valve sleeve, the valve housing being eliminated for clarity.

For clarity, flow grooves as seen in FIG. 1 are all shown in one plane.

In general, the basic concentric arrangement of a steering spindle, valve plug and valve sleeve, etc., is well known in valves of this kind and accordingly only a brief description of the mechanical operation need be given.

Thus, the encompassing housing 1 holds the usual steering spindle 2 understood to be rotated by a steering wheel (not shown) including a torsion rod 3 connected to the steering pinion 5 shown fragmentarily. The rotary valve plug 4 operated by the steering spindle has relative rotation with the encompassing valve sleeve 6 when torque rod 3 is stressed in the usual manner. Relative movement between these valve members effects flow control in a manner to be described, wherein feed pressure is supplied through feed pressure port 7, passing through the valve to one chamber of servomotor 8 and return from the other chamber through the valve to the return port 9. Common channels comprising spacing A and groove B denote in FIG. 1 return and pressure circuits, respectively, provided in the usual manner, groove B being on the outer periphery of valve sleeve 6. Similarly, common channels comprising grooves C and D connect to the left and right side chambers of servomotor 8, respectively.

Referring to FIG. 1, the neutral position of the valve, the usual six arcuate closed end longitudinal grooves 10–15 are provided arrayed equiangularly in the interior surface of valve sleeve 6. The left-hand chamber of servomotor 8 connects via groove C to grooves 11, 13, 15 and the right-hand chamber connects via groove D to grooves 10, 12, 14.

Figure 2:
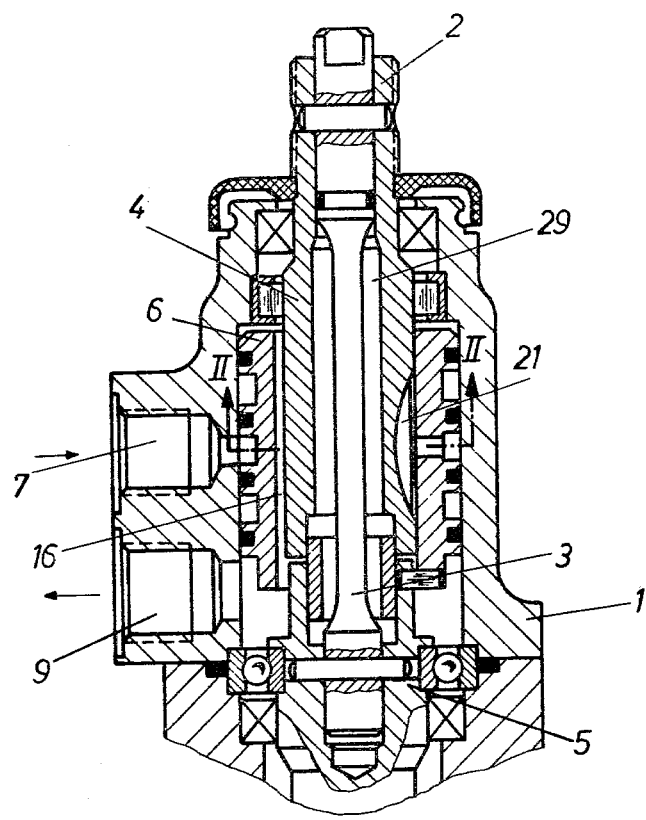
FIG. 2 shows a longitudinal elevation of components of the invention.

Additionally, three narrower longitudinal return flow open ended grooves 16, 17, 18 are provided the full length of the valve sleeve, all communicating with spacing A leading to return port 9. FIG. 2 illustrates the groove 16 extending the full length of valve sleeve 6 to the spacing A between the valve plug and the housing adjacent outlet port 9 for connection to a sump (not shown). It will be understood that grooves 17 and 18, likewise the full length of valve sleeve 6, have similar return flow communication.

Groove B connects to pressure flow ports 37, which are all equiangularly arrayed as shown.

As will be seen, selective directional rotation operates servomotor 8 pressurizing one side while exhausting the other through a throttling means.

On valve plug 4 there are but three of the usual six pressure flow grooves, denoted as 19, 20, 21. These are relatively wide closed end arcuate grooves milled in the longitudinal direction as seen for groove 21 in FIG. 2 and each aligned with a respective pressure flow ports 37 all fed by peripheral pressure flow groove B from pressure supply port 7.

In the valve plug intermediately of the grooves 19, 20 and 21, equiangularly arrayed, are respective pairs of return flow grooves 22 and 25, 23 and 26, 24 and 27. Each such double groove formation is effected by a respective partition or bridge 36 between the grooves of each pair for economy of production. These pairs of grooves are arcuate closed end grooves, similar to grooves 19, 20, 21. Grooves 22, 23 24 are always in communication with a respective throttling bore 28. Grooves 25, 26, 27 are always in communication with a respective throttling bore 30. The throttling bores are of predetermined diameter depending on size and flow conditions of a particular system.

The three pairs of throttle bores 28, 30 pass chordally through the wall of valve plug 4 to the hollow interior 29. They are preferably at the mid-plane, e.g., on section line II—II, and the bores 28, 30 of each pair are preferably axially parallel.

It will be noted that the throttling bores are all symetrically arrayed with the communicating grooves 22–27 around the axis of the valve plug in the neutral position, e.g., for straight ahead steering where the servomotor B is in a booster steering system. It may be noted at this time that an annular, somewhat slalom-like, open flow channel exists between the valve plug and sleeve in the neutral position, so that pump flow from port 7 can circulate via groove B, and pressure ports 37 pressurelessly, around the annular channel and via return flow grooves 16, 17, 18 to spacing A and exit via port 9. In particular, at that time no flow or negligible flow passes through the throttle bores, such circulatory flow occurring via grooves 16, 17, 18 and flow control edges 31–35, all of which are open.

Each reference numeral for a flow control edge will be understood to refer to a pair of coacting edges. For example, edge 31, which demarcates an edge of groove 11 and the adjacent edge of groove 20, in the valve sleeve 6 and valve plug 4, respectively. Such adjacent edges, as a coacting pair, are for convenience termed a flow control edge such as flow control edge 31 movable to form a flow gap as seen in FIG. 1, or closed to shut off flow if valve plug 4 were to have counterclockwise rotation relative to valve sleeve 6, which would occur in a steering operation.

The array is symettrical as to all ports, edges, grooves, etc. shown in FIG. 2, there being three sets of flow control edges 31–35. Not all components are specifically numbered, thus avoiding undue repetitiousness of reference numerals. Each pressure flow control edge 35 has a counterpart flow control edge 31 at the opposite side of the respective groove, e.g., grooves 10, 12, 14, which are return flow grooves. Such unnumbered edges coact with respective adjacent unnumbered edges of the partitions 36 to effect opening and closing of flow, as do the numbered control edges 35, dependent on direction of rotation of valve plug member 4 relative to valve sleeve member 6.

In the neutral position, as seen in FIG. 1, flow takes place in three symettrically arrayed paths. All flow control edges are open. Each path is divided into a clockwise and a counterclockwise stream. Thus, flow pressure flow is from port 7 via groove B to a pressure flow ports 37, groove 20, dividing clockwise through the open flow control edges 31, 32 and 33 via intermediate grooves 11 and 25 to return flow groove 16 and spacing A. In the other direction, counterclockwise, via open adjacent flow control edge 35 and the control edges counterclockwise therefrom past grooves 12 and 23 to return flow groove 17 and spacing A.

A second path having clockwise and counterclockwise streams flows in a similar manner, via a pressure flow port 37 and dividing at groove 19 via flow control grooves 10, 22 and 15, 27 to respective grooves 16 and 18, to spacing A.

A third path via a port 37 to groove 21, dividing to grooves 17 and 18, to spacing A, by means of flow being divided via adjacent flow control edges 31 and 35, past grooves 13 and 26 in the clockwise direction and 14 and 24 in the counterclockwise direction.

In FIG. 3, the full black arrows show the path of high pressure flow to a pressure chamber of a cylinder while the half black arrows show return from the other chamber to the valve. The white arrows show the return flow lowered pressure after throttling in the valve.

During a steering operation if it be assumed that there is relative rotation in the direction of the shown arrow on valve plug 4 (FIG. 1), there are three pressure flow paths from port 7 via groove B to the pressure flow ports 37, and thence to respective pressure flow grooves 19, 20, 21 of valve plug 4.

The right-hand chamber of the servomotor 8 connects via lines, as shown, to ports (not numbered) of valve sleeve 6 that communicate with respective grooves of the valve sleeve, viz., servomotor flow grooves 10, 12, 14. The left hand chamber connects similarly with ports for respective servomotor flow grooves 11, 13, 15, in the valve sleeve. Each group of the aforesaid three ports and respective grooves is either conducting pressure flow or return flow to a respective servomotor chamber during a steering operation. As shown in FIG. 1, they are disposed in alternate peripheral arrangement of connection to the servomotor to preserve multiple flow path symmetry as are all grooves and bores seen on FIG. 1.

Due to the relative rotation, all three flow pairs of control edges 32 and 34 close the respective throttling bores 30 which now communicate at their outer ends via grooves 25, 26, 27, respectively with return flow grooves 16, 17, 18, respectively, in the valve sleeve and at their inner ends with valve plug interior bore 29. Edges 31 and 33 are open, as to the three pairs.

All the throttling bores 28 now communicate between the valve plug interior bore 29 and their respective grooves 22, 23, 24 to the connection bores for the right hand chamber of the servomotor 8. This effects three simultaneously open return flow paths from that chamber via the three throttling bores 28 to valve plug interior bore 29 thence outwardly therefrom through the three throttling bores 30 to the respective three grooves 25, 26, 27 and thus to return flow grooves 16, 17, 18 all of which are interconnected with groove A and thus to return port 9.

Meanwhile, the left hand chamber of the servomotor 8 is pressurized from port 7 via groove B and the three ports 37 with pressure flow control and regulation effected by the three flow control edges 35, which regulate the operating pressure as they approach closing and become closed. When fully closed, all pressure flow from grooves 19, 20, 21 is shut off from being bypassed via the return flow ports 10, 12, 14 to sump return port 9.

The pressure flow sequence follows three symmetrically arrayed paths, initially from ports 37 to respective pressure flow grooves 19, 20, 21 and thence through the open flow control edges 31 opposite the closed edges 35 of grooves 19, 20, 21; thence from grooves 19, 20, 21 to respective grooves 15, 11, 13 and outwardly through the respective bores to groove C, to the left-hand chamber of the servomotor.

For the other direction of valve plug rotation return flow from the left-hand chamber of cylinder 8 via channel C passes through throttling bores 30 to respective return grooves 25, 26, 27.

Thus if the relative rotation of the valve plug 4 and valve sleeve 6 be in the opposite direction, and bearing in mind that valve sleeve grooves 19, 20, 21 always have pump pressure, pressure flow is now via open flow control edgs 35, control flow edges being closed to shut off high pressure bypass to sump return via respective grooves 22, 23, 24. At the same time all edges 32 and 34 are open and all edges 31 and 33 are closed. Accordingly, pressure flow to the right-hand chamber of servomotor 8 takes place, and return flow from the left-hand chamber to throttling bores 30 takes place, such flow passing through valve plug interior 29 to throttling bores 28 and thence to respective grooves 25, 26, 27 and via respective return grooves 16, 17, 18 to groove A and return port 7.

Accordingly, for either direction of rotation return flow passes serially, via space 29, either from bores 28 to bores 30, or from bores 30 to bores 28.

The serial flow arrangement enhances the throttling effect and noise reduction. Actually, although it is convenient to speak of serial flow between bores 28, 30 of each pair, it will be understood that there is mixing or commingling of flow in space 29 from all bores 28 to all bores 30, and vice versa.

The throttling pressure ratio is determined by the choice of the sizes, e.g., the diameters of the throttling bores 28 and 30. From upstream to downstream in the throttling process, throttle pressure is reduced gradually because of the serial flow through multiple bores. Such gradual reduction is of advantage to insure full minimization or precluding of all flow noises which might not otherwise be the case were only one throttling bore to be used. A still further advantage is the fact that the return flow is divided up through three serial throttling passages, each of which consist of two bores, and such multiple passages permit a more rapid rate of return discharge. A still further advantage of the arrangement is found in the fact that the sealing rings in the device need only withstand customary low return pressure.

It will be appreciated that throttling bores such as 28 and 30 could be arranged for series flow on the exterior of valve sleeve 6, instead of through the valve plug 4. The important criteria is merely that the entire return oil flow be conducted with gradual reduction of pressure by the use, basically of throttling bores in series in this modification.

Also, the groove pairs 22 and 25, 23 and 26, 24 and 27, all in rotary plug 4, through which return flow takes place have in each instance been machined as double grooves by means of respective separating partitions 36 which is a feature that simplifies production of the rotary plug.

In the modification of FIGS. 4 and 4a, the restricted through passages are in the form of grooves such as 28' peripherally disposed at the tips of the partitions 36' which are between the respective flow return grooves 22' and 25'. Such throttling passage can be grooves, slots, indentations, rabbets, etc., suitably sized for particular systems, usable especially where pressure and noise problems are not so severe as to make serial throttling flow preferable.

In FIG. 4, the high pressure flow from line 7 is not indicated by arrows since it is quite obviously directed to the valve ports and to one chamber of the cylinder. The half black arrows show return flow from the exhaust side of the cylinder to the valve before throttling. The white arrows show the lowered pressure flow paths of return flow after throttling.

The arrows show return flow to port 9, from a servomotor chamber, all components of the structure of valve sleeve member 6 being the same, such as common return flow groove 16.

Valve plug member 4' has, of course, been modified in order to replace the bores 28, 30 and to provide the plurality of grooves 28', all in symmetrical array.

As seen by the arrows, return flow is from the right-hand chamber of a servomotor (not shown), such return flow being through the restricted passages 28' for throttling purposes. Since the outer peripheral sides of the throttle passages 28' are open, the restriction is effected when the valve plug is rotated so that the inner wall of the valve sleeve closes such open sides.

As described for FIGS. 1–3, return flow occurs when relative rotation of, for example, the valve plug member is effected in the direction of the arcuate arrow thereon. Flow control edge 34 (FIG. 4a) is closed, and as indicated by the broken line from pressure supply 7, bypass of pressure flow is cut-off to the common return grooves such as groove 16.

In neutral position, the virtually pressureless flow from supply 7 circulating between the valve members occurs divided clockwise and counterclockwise to exit at the return flow grooves 16, 17 and 18, as described for FIG. 2.

What is claimed is:

1. A rotary control valve of the kind having a valve sleeve member (6) encompassing a valve plug member (4) and means (2, 3) for effecting relative rotation therebetween wherein said members have respective groove means with flow control edges (31–35) coacting between said valve members for pressure flow and return flow control whereby pressure and return flow to and from a servomotor is controlled by relative rotation of said members, and which includes respective connection means (A, B, C, D, 37, etc.) for a pressure supply port (7), sump return port (9), and for servomotor (8) chambers wherein said flow control edges selectively effect closure and opening of flow upon relative rotation of said valve members to direct pressure flow to a servomotor and return flow therefrom and in a neutral position bypass flow from a pressure supply to sump return; the improvement which comprises:
   one (4) of said members having throttling means (28) communicating with return flow groove means (16) of the other (6) of said members in a relatively rotated position of said valve members to throttle return flow through said valve from a servomotor wherein said throttling means comprises a flow through passage means of predetermined size to effect noise stifling throttling;
   said flow control edges (31–35) alternately opening and closing to alternately direct return and pressure flow between said valve and a servomotor, dependent on direction of relative rotation;
   all said flow control edges being disposed to be open in a neutral position of said valve members to permit flow to bypass said throttle means from pressure supply port to sump return port.

2. A rotary control valve as set forth in claim 1, said return flow groove means comprising at least one return flow groove (16) extending the full length of said other member (6) and communicating between a servomotor and a sump return port with return flow from said servomotor being directed by said flow control edges through said throttling means to said return flow groove (16) in said relatively rotated position.

3. A rotary control valve as set forth in claim 1, said throttling means comprising a pair of throttling bores (28, 30) including respective return flow grooves (22, 25) in said one valve member (4) communicating integrally with respective throttling bores (28, 30) and having respective return flow control edges (32–34) to control flow alternately to one of said throttling bores and from the other throttling bore; including means (29) to effect serial flow therebetween.

4. A rotary control valve as set forth in claim 3, said return flow grooves comprising a pair of grooves (22, 25) separated by a partition (36) integral with said valve plug member (4) and each said groove connecting with a respective throttle bore (28, 30);
   said flow control edge means (32–34) comprising opposite edges of said partition (36) and being open to a sump return flow groove (16) in said valve sleeve member (6) in neutral position of said valve members.

5. A rotary control valve as set forth in claim 3, wherein said means for effecting serial flow comprises an axial bore (29) in said one valve member (4);
   said throttling bores extending transversely from the exterior of said valve member (4) to said axial bore (29).

6. A rotary control valve as set forth in clam 4, said sump return flow groove (16) in said valve sleeve member (6) being generally radially aligned with said partition (36) and communicating with a sump return port (9) in neutral position and
   said valve sleeve member comprising a servomotor flow groove (10, 11) on each side of said sump return flow groove (16); said latter flow control edge means (32, 34) comprising edges of said sump return flow groove and said servomotor grooves;
   whereby relative rotation of said valve members connects one or the other of said throttle bores selectively to either chamber of a double ended servomotor for return flow therefrom.

7. A rotary control valve as set forth in claim 5, including a pressure flow port means (37) in said valve sleeve member (6) communicating with a pressure supply (7);
   a pressure flow groove (19) in said valve plug member (4) communicating with said pressure flow port means (37);
   a servomotor flow groove (11, 12) on each side of said pressure flow groove (19) and in said valve sleeve member (6);
   said valve members having alternately closable and openable flow control edges (31, 35) to respectively shut off pressure supply to return port of bypass flow upon said relative rotation of said valve members and to permit pressure flow to said servomotor via one of said servomotor flow grooves and return flow from said servomotor via the other of said servomotor flow grooves dependent on direction of rotation of one of said valve members.

8. A rotary control valve as set forth in claim 1, said throttling means comprising a pair of throttling bores (28, 30) including respective return flow grooves (22, 25) in said one valve member (4) communicating integrally with respective throttling bores (28, 30) and having respective return flow control edges (32–34) to control flow alternately to one of said throttling bores and from the other throttling bore;
   including means (29) to effect serial flow therebetween;
   said return flow grooves comprising a pair of grooves (22,25) separated by a partition (36) integral with said valve plug member (4) and each said groove connecting with a respective throttling bore (28, 30);
   said flow control edge means (32–34) comprising opposite edges of said partition (36) and being open to a sump return flow groove (16) in said valve sleeve member (6) in neutral position of said valve members.

9. A rotary control valve as set forth in claim 1, said flow through passage means comprising at least one passage of predetermined size to effect a predetermined throttling pressure ratio in return flow therethrough.

10. A rotary control valve as set forth in claim 1, including in plurality and in equiangular array sets of flow control edges (31-35), and sets of throttling means; and a plurality of common return flow grooves (16, 17, 18);
whereby flow to and from a servomotor follows a plurality of paths distributed symmetrically about the axis of said valve members.

11. A control valve as set forth in claim 9, wherein said throttling means comprises a plurality of pairs of throttling bores (28, 30) including respective return flow grooves (22-27) in said one valve member (4) communicating integrally with respective throttling bores (28, 30) and having respective return flow control edges (32-34) to control flow alternately to one of said throttling bores and from the other throttling bore;
including means (29) to effect serial flow therebetween for each pair.

12. A rotary control valve as set forth in claim 9, said means for effecting serial flow comprising an axial bore (29) in said valve member (4); said throttling bores (28, 30) comprising transverse bores from the exterior of said valve member to said axial bore (29).

13. A rotary control valve as set forth in claim 1, wherein said throttling means comprises a pair of longitudinal return flow grooves (22', 25') on said valve plug member having a partition (36) therebetween and a restricted passage (28') at the circumferential edge of said partition including a respective flow control edge on each side of said partition; said partition being in radial alignment with a common return flow groove in said valve sleeve member in neutral position of said valve members;
wherein said flow control edges are open in said neutral position to effect bypass flow from a supply port to a sump port and wherein relative rotation in one direction or the other between said valve members restrictively closes one such flow control edge whereby a throttled flow is effected through said restricted passage for return flow from a servomotor.

14. A rotary control valve as set forth in claim 13, wherein said partitions and said pairs of return flow grooves and said return flow edges are provided in plurality to communicate alternately with respective common return flow grooves.

* * * * *